United States Patent [19]

Vrignaud et al.

[11] 4,386,107

[45] May 31, 1983

[54] POLLEN SUBSTITUTE FOR USE IN APICULTURE

[76] Inventors: Yves Vrignaud, 5 avenue Rivoli, 92190 Meudon; Michel Belin, 18 rue du Bourg Voisin, 21140 Semur en Auxois, both of France

[21] Appl. No.: 266,189

[22] Filed: May 22, 1981

[30] Foreign Application Priority Data

May 29, 1980 [FR] France ................................ 80 11894

[51] Int. Cl.³ ............................ A23J 3/00; A23K 1/18
[52] U.S. Cl. ...................................... 426/62; 426/656; 426/1
[58] Field of Search ..................... 426/656, 658, 2, 62, 426/1

[56] References Cited

U.S. PATENT DOCUMENTS 2,895,829  7/1959  Feo et al. .............................. 426/72

FOREIGN PATENT DOCUMENTS 141203  5/1951  Australia ................................. 426/2
679197  8/1979  U.S.S.R. .................................. 426/2

*Primary Examiner*—Raymond N. Jones
*Assistant Examiner*—Elizabeth J. Curtin
*Attorney, Agent, or Firm*—Holman & Stern

[57] ABSTRACT

A pollen substitute for rearing honeybees can be used in either powder or paste form and has a formula similar to that of natural pollen. The substitute is composed of a mixture of lactic yeasts, vegetable proteins, egg proteins, and may receive an addition of acid, sugar and aromatic product.

12 Claims, No Drawings

POLLEN SUBSTITUTE FOR USE IN APICULTURE

This invention relates to a pollen substitute for use especially in apiculture.

For the purpose of rearing honeybees, it is necessary to make up for any shortage of pollen which may occur for climatic reasons or at the end of the winter season. Under such circumstances, the food stocks of a hive become depleted whereas the colony should rear as many larvae as possible.

Beekeepers have sought to solve this problem of addition of protein products but have failed up to the present time to achieve a wholly satisfactory result.

A number of products have been proposed and employed but chief among these can be mentioned sugar syrups, egg powders, yeasts, protein substances such as corn-soaking water.

The relative failure of these different artificial food products arises essentially from an unbalance in the proportions of the elementary substances proposed with respect to the composition of natural pollen.

The immediate practical result of these disadvantages is a lack of appetite of the bees with all the consequences of undernourishment in regard to prosperity of the colony and honey production.

The invention is directed to a food composition having an amino acid and vitamin content which is practically identical with that of pollen containing 23–25% protein substances, is wholly assimilable by bees and well accepted by the worker bees.

The invention is directed to a food pollen substitute for use in apiculture and essentially containing approximately 60 to 66% by weight of lactic yeasts, 32 to 38% by weight of vegetable proteins, 1 to 2.5% by weight of whole-egg powder.

A substitute of this type can also contain in addition approximately 0.2 to 0.5% by weight of an acid from the group comprising the citric, tartaric, acetic, lactic acids, the pH value in a 1% aqueous solution of a substitute of this type being of the order of 4.2 to 4.5.

A substitute in accordance with the invention may also advantageously contain 7 to 55% sugar, 5 to 10% natural pollen in order to stimulate the appetite of the bees at least at the outset as well as, for the same reasons, 0.20 to 0.50% of an aromatic product consisting of Chinese anise-tree inflorescence powder or of other vegetable aromas.

A substitute of this type may also contain approximately 10 to 40% by weight of water.

In order to prepare a substitute in accordance with the invention, use can advantageously be made of the lactic yeasts of the type designated as Kluyveromyces Fragilis and/or Kluyveromyces Lactis cultivated on lactoserum or other food yeasts (dried killed yeasts having no diastasic powder).

In regard to vegetable protein, preference will be given to the use of proteins from the group comprising proteins of potatoes, corn, soybean and other leguminous plants in the form of concentrates and isolates as well as soluble casein and caseinates.

A substitute in accordance with the invention can be prepared in the state of impalpable powder to be employed in the untreated state which is similar to natural pollen.

In another embodiment, the substitute is prepared in the form of powder to be mixed with sugar syrup in order to form a paste. This form of food product is commonly used by beekeepers but does not have the advantages of immediate acceptance of the powder by bees.

A more complete understanding of the invention will be gained from the following detailed description of two embodiments of the invention.

EXAMPLE 1

Preparation of a substitute in order to form a nutritional paste for bees.

The initial step consists in mixing 7.450 kg of sugar in the form of impalpable powder with 0.350 kg of finely ground citric acid, 0.200 kg of Chinese Anise-tree inflorescence powder in the finely ground state and 1 kg of whole-egg powder.

The mixing operation is carried out in a conventional powder mixer. When the powder is in a homogeneous state, there are then added 59 kg of lactic yeast containing 48–52% proteins of the type which is marketed under the commercial designation of Protibel by the company known as Fromageries Bel, and 32 kg of potato proteins of the type marketed under the commercial designation of "Lysamine" by the company known as Roquette Frères.

The average analysis of this substitute is 50% protein, 5% lipids, 33% glucides, 5% mineral substances and 5% moisture. The substitute contains all the vitamins including at least 0.9 mg/100 g of vitamin B1, 2.1 mg/100 g of vitamin B2 as well as 5.1 mg/100 g of nicotinic acid, 5.9 mg/100 g of pantothenic acid and 38.9 mg/100 g of vitamin C. This substitute is employed by incorporating it with a thick sugar syrup in order to obtain an unctuous paste containing 50% by weight of saturated sugar syrup, 40% substitute and 10% natural pollen. It is an advantage to allow the paste to stand in a refrigerator for a period of 24 hours in order to ensure that the powdered substitute is well impregnated with the liquid.

The paste can then be deposited on the head of the hive frames above the cluster. This paste contains 23 to 25% proteins.

The paste supplies the bee colony with a perfectly balanced food product containing proteins, lipids, amino acids, vitamins and trace elements which are all essential for rearing bee larvae. The use of this product is particularly advantageous during the spring when pollen is in short supply or cannot be gathered by foraging bees on account of unfavorable weather conditions.

This food product can also be used throughout the year, especially in order to assist recovery of a bee colony from the damaging effects of pesticides as well as to produce a strong colony for specialized seasonal collection of pollen and nectar or for the formation of swarms.

Said food product also serves to prevent the sudden reduction in larval rearing which is otherwise liable to occur at the end of the summer or in the fall.

EXAMPLE 2

Preparation of a powder substitute which can be directly employed instead of pollen.

This powder offers the same advantages as the paste product but is even more readily accepted by the bees by reason of its appearance and consistency which are extremely close to those of natural pollen.

It is thus possible to employ this powdered substitute by pouring the powder over the frame head above the cluster. For the first applications, it is preferable to pour the powder directly on the bees. At a later stage, the powder can be deposited on the frames in small heaps or within the beeway.

In order to prepare this substitute, the first step consists in mixing together 29.5 kg of Protibel lactic yeast, 7 kg of Lysamine protein, 0.5 kg of whole-egg powder, 0.175 kg of citric acid in the form of impalpable powder and 0.1 kg of Chinese anise condiment in the form of impalpable powder. These different products are mixed together in a conventional powder mixer and 53.725 kg of sugar in the form of impalpable powder is added when the mixture is entirely homoegeneous. A quantity of 3 to 5% natural pollen may be added if necessary. For this particular use of the product in the form of powder, it will be an advantage to employ icing sugar containing a very low proportion of starch or alternatively a sugar having a grain size within the range of 25 to 30 microns to which is added a very low percentage of noncaking calcium phosphate of the type marketed by the company known as "Sucrerie de Tirelemont" in Belgium.

The substitute thus obtained in powdered form can be collected by bees in the form of a ball or pellet in much the same manner as natural pollen, thus making it even more acceptable.

The powder substitute thus formed has a weight content of at least 23% proteins, 2.5% lipids, 64.7% glucides, 2.8% mineral substances, 5% moisture as well as all the vitamins including at least 0.450 mg/100 g of vitamin B1, 1.050 mg/100 g of vitamin B2, 2.550 mg/100 g of nicotinic acid, 7.700 mg/100 g of pantothenic acid and 20 mg/100 g of vitamin C.

The table given hereinafter serves to establish a comparison between natural pollen and the powder substitute. Both in the state of paste and in the state of powder, the substitute in accordance with the invention ensures uniform growth of larvae which are normal both in regard to pupation and hatching-out. The bees thus obtained by this method of rearing are just as strong and vigorous as any bees reared on pollen and have the same length of life. Their colonies live through the winter season without any difficulty. The coefficient of digestive utilization of the substitutes in accordance with the invention is higher than 80%. They have a perfectly balanced composition which ensures uniform results in the rearing of young honeybees.

COMPARATIVE TABLE
OF COMPOSITION OF POLLEN AND OF PROTIVY 25
PER 100 g OF PRODUCT

|  | POLLEN | SUBSTITUTE (Powder) |
|---|---|---|
| Moisture | 12.74 | 5 |
| Protein substances | 24.85 | 25 |
| Fats | 8.45 | 2.6 |
| Mineral substances | 2.53 | 2.4 |
| pH (on ground at 1%) | 4.9 | 4.4 |
| AMINO ACIDS |  |  |
| Hydroxyproline | 0.24 |  |
| Cysteic acid | — |  |
| Aspartic acid | 2.87 | 2.467 |
| Threonine | 1.04 | 1.300 |
| Serine | 1.38 | 1.225 |
| Glutamic acid | 2.63 | 2.970 |
| Proline | 3.02 | 1.007 |
| Glycocoll | 1.19 | glycogen 3.60 |
| Alanine | 1.27 | 1.702 |
| Valine | 0.60 | 2.140 |
| Cystine | 0.30 | 0.290 |
| Methionine | 0.49 | 0.390 |
| Isoleucine | 0.62 | 1.150 |

-continued
COMPARATIVE TABLE
OF COMPOSITION OF POLLEN AND OF PROTIVY 25
PER 100 g OF PRODUCT

|  | POLLEN | SUBSTITUTE (Powder) |
|---|---|---|
| Leucine | 1.71 | 2.230 |
| Tyrosine | 0.78 | 1.010 |
| Phenylalanine | 1.13 | 1.380 |
| Lysine | 1.54 | 1.725 |
| Histidine | 0.67 | 0.468 |
| Arginine | 1.32 | 1.38 |

What is claimed is:

1. A food pollen substitute for use in apiculture, wherein said substitute contains by weight approximately:
60 to 66% lactic yeasts,
32 to 38% vegetable proteins,
1 to 2.5% whole-egg powder
with a total protein content of approximately 23 to 25% by weight.

2. A food pollen substitute according to claim 1, wherein said substitute additionally contains by weight approximately: 0.2 to 0.5% of an acid of the group comprising the citric, tartaric, acetic, lactic acids, the pH value in a 1% aqueous solution of said substitute being of the order of 4.2 to 4.5.

3. A food pollen substitute according to claim 1, wherein said substitute additionally contains approximately 7 to 55% by weight sugar.

4. A food pollen substitute according to claim 1, wherein said substitute additionally contains approximately 5 to 10% by weight of natural pollen.

5. A food pollen substitute according to claim 1, wherein said substitute additionally contains approximately 0.20 to 0.50% by weight of Chinese anise inflorescence powder.

6. A food pollen substitute according to claim 1, wherein said substitute additionally contains approximately 10 to 40% by weight of water.

7. A food pollen substitute according to claim 1, wherein the lactic yeasts are yeasts of the type known as Kluyveromyces Fragilis and/or Kluyveromyces Lactis cultivated on lactoserum.

8. A food pollen substitute according to claim 1, wherein the vegetable proteins form part of the group comprising the proteins of potatoes, corn, soybeans, casein and the caseinates.

9. A food pollen substitute according to claim 1 and intended to be mixed with an approximately equal weight of sugar syrup in order to form a paste, wherein said substitute contains by weight approximately 50% proteins, 5% lipids, 33% glucides, 5% mineral substances and 5% water.

10. A food pollen substitute according to claim 9, wherein said substitute consists of a homogenous mixture of 59 parts by weight of yeasts, 32 parts by weight of potato proteins, 1 part by weight of egg powder, 7.450 parts by weight of sugar, 0.350 part by weight of citric acid and 0.200 part by weight of Chinese anise powder.

11. A food pollen substitute according to claim 1, wherein said substitute contains in the state of impalpable powder approximately and by weight 24% proteins, 2.5% lipids, 64.7% glucides, 2.8% mineral substances and 5% water.

12. A food pollen substitute according to claim 11, wherein said substitute consists of a homogeneous mixture of 29.5 parts by weight of yeasts, 16 parts by weight of potato proteins, 0.5 part by weight of egg powder, 53.725 parts by weight of sugar, 0.175 part by weight of citric acid and 0.1 part by weight of Chinese anise powder.

* * * * *